Sept. 11, 1956 N. E. LINDENBLAD 2,762,857
THERMOELECTRIC MATERIALS AND ELEMENTS UTILIZING THEM
Filed Nov. 1, 1954
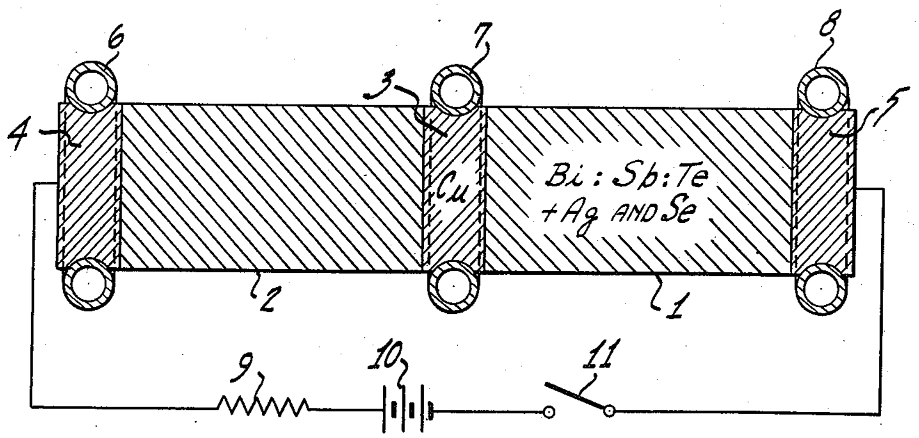
INVENTOR.
NILS E. LINDENBLAD
BY J. L. Whittaker
ATTORNEY

United States Patent Office 2,762,857

Patented Sept. 11, 1956

2,762,857

THERMOELECTRIC MATERIALS AND ELEMENTS UTILIZING THEM

Nils E. Lindenblad, Princeton, N. J., assignor to Radio Corporation of America, a corporation of Delaware Application November 1, 1954, Serial No. 465,806

8 Claims. (Cl. 136—5)

This invention relates to improved thermoelectric materials and elements and more particularly to alloys useful in thermoelectric devices comprising single or multiple junctions between different metals. Such elements used as part of an electric circuit generate an electric current when the junction has a temperature different from the rest of the circuit or they generate heat or cold at the junction when a current in one or the other direction is passed through the circuit.

One object of the instant invention is to provide improved thermoelectric alloys and elements made of such alloys.

Another object is to provide improved thermoelectric alloys of relatively great physical strength which may be readily and easily prepared.

Many previous compositions useful for thermoelectric devices are relatively weak physically being friable and fragile much in the manner of blackboard chalk crayons. Typical of these materials are CdSb and ZnSb. Further, many of these materials comprise relatively complicated phase systems and are difficult to control uniformly when they are cooled from their melting temperatures.

The instant invention provides improved thermoelectric materials having thermoelectric properties fully comparable to the thermoelectric properties of the best previously known materials. In addition, the materials of the invention are relatively simple to prepare, forming stable systems immediately upon freezing.

The compositions within the scope of the instant invention include alloys within the following range:

| | |
|---|---|
| Tellurium | 55–65 mol. per cent |
| Bismuth | 17–32 mol. per cent |
| Antimony | 8–23 mol. per cent |
| Silver, mercury, or gold, or combinations thereof. | 0–0.56 wgt. per cent based on the total weight of Te, Bi and Sb. |
| Selenium or sulfur, or combinations thereof. | 0–1.7 wgt. per cent based on the total weight of Te, Bi and Sb. |

All the compositions within the scope of the invention are relatively simple to prepare being subject to very little variation in phase composition due to variations in cooling.

The invention will be described in greater detail with reference to the accompanying drawing of which the single figure is a schematic, cross-sectional, elevational view of a thermoelectric element according to the invention.

The element shown in the drawing is composed of two thermoelectrically differential members 1 and 2 which are conductively joined by an intermediate conductive part 3 of slight or negligible thermoelectric power. The member 1 consists of an alloy of 60 mol. per cent Te, 20 mol. per cent Bi, 20 mol. per cent Sb, 0.28 wgt. per cent Ag and 0.56 wgt. per cent Se. The proportions of Ag and Se are based upon the total weight of the Te, Bi and Sb in the alloy since the Ag and the Se are added as impurities rather than as major constituents.

The member 2 may consist of any desired thermoelectric composition complementary to the alloy such as, for example, lead telluride. The intermediate part 3 which connects the differential members to form a thermoelectric junction between them consists preferably of copper. It serves as a cooling terminal for the removal of heat from a medium and may be contacted by a pipe coil 7 to conduct a fluid coolant to a distant location. Alternatively the member may be shaped as a thin vane or other structure for cooling only in its immediate environment.

An energizing circuit comprising a current source 10, a resistor 9 and a control switch 11 is connected to the element by copper end terminals 4 and 5. The end terminals are provided with single turn pipe coils 6 and 8 through which a heat transporting fluid may be pumped to maintain them at a relatively constant temperature. Thus when the action of the current through the thermoelectric junction produces a temperature differential between the intermediate terminal 3 and the end terminals, the end terminals may be maintained at a constant temperature and the intermediate one may be reduced in temperature.

The compositions according to the instant invention are of the so-called p-type thermoelectric class, i. e., when they are connected in an electric circuit an applied potential will produce heating at the negative connection and cooling at the positive connection.

The following table lists several different compositions within the scope of the invention together with their critical thermoelectric constants. The thermal conductivities of the different compositions listed differ only insignificantly one from another and they have, therefore, not been determined.

| | 1 | 2 | 3 | 4 | 5 |
|---|---|---|---|---|---|
| Te, mol. percent | 60 | 60 | 60 | 60 | 60 |
| Bi, mol. percent | 20 | 27 | 32 | 17 | 20 |
| Sb, mol. percent | 20 | 13 | 8 | 23 | 20 |
| Ag[1], wgt. percent | 0.28 | 0.28 | 0.28 | 0.28 | ------ |
| Se[1], wgt. percent | 0.56 | 0.56 | 0.56 | 0.56 | ------ |
| Thermoelectric E. M. F., $\mu$v./°C. (in junction with lead) | 140 | 170 | 200 | 115 | 115 |
| Restivity, ohm-cm | .0005 | .001 | .002 | .0005 | .0013 |

[1] Wgt. percent based on the total weight of Te, Bi and Sb.

The effective thermoelectric power of a junction utilizing two thermoelectric compositions may be expressed as:

$$\phi_{ab'} = \frac{2\phi_{ab}}{\left(\sqrt{\frac{PK}{kT}}\right)_a + \left(\sqrt{\frac{PK}{kT}}\right)_b}$$

where:

$\phi_{ab}$ is the thermoelectric E. M. F. of a junction between two metals $a$ and $b$ P is electrical resistivity K is thermal conductivity $k$ is a constant ($=2.45\times10^{-8}$ volt $^2/°$ C.$^2$)

T is absolute temperature

Since the major component of K is lattice conduction and since all the listed compositions have substantially the same lattice dimensions, the reasonable assumption may be made that the value of K is substantially the same for all the compositions of the invention. For purposes of comparing the different compositions with each other, therefore, K, for the alloys of the invention may be considered a constant. Resistivity is thus seen to be a relatively important quality determining factor in judging the relative worth of thermoelectric alloys, especially those of closely related alloy systems.

The first composition listed in the table is a preferred composition of the invention for use in most common thermoelectric applications. Primarily because of its relatively low resistivity this alloy in thermoelectric junction with the best presently known n-type compositions provides greater effective thermoelectric powers than the other listed compositions. It should be noted, however, that especially for purposes other than thermoelectric cooling by the so-called Peltier effect, other compositions within the scope of the invention may be preferred. Such other purposes may include making thermocouples to measure temperature or to convert solar energy directly into electrical form.

In respect of the impurity ingredients in the alloys of the invention silver, gold and mercury serve to decrease the resistivities of the alloys without proportionately adversely affecting their thermoelectric E. M. F.'s. In this regard silver is markedly superior in effect to gold and to mercury in that it increases the thermoelectric E. M. F. The selenium or sulfur additions serve to increase the thermoelectric E. M. F.'s of the alloys without proportionately adversely affecting their resistivities. Sulfur and selenium appear to be fully equivalent to each other in effect and either may be added to the compositions in elemental form or as compounds of bismuth or antimony. The optimum proportions for these impurity additions are, respectively, 0.28 wgt. per cent for the metallic impurities and 0.56 wgt. per cent for the sulfur or selenium based on the total weight of the alloy without the impurities. These impurities improve the thermoelectric properties of the alloys of the invention when they are added thereto even in minute proportions. Too great additions however, should be avoided. Silver in proportions substantially in excess of the upper limit heretofore specified tends adversely to affect the thermoelectric E. M. F.'s of the alloys. Conversely, excessive additions of sulfur and selenium tend to increase the resistivities of the alloys beyond tolerable limits.

There have thus been described improved thermoelectric elements of novel compositions which possess exceptionally advantageous thermoelectric properties, relatively great physical strength and which are easily and simply prepared.

What is claimed is:

1. A thermoelectric alloy consisting essentially of:

| | | |
|---|---|---|
| Tellurium | mol. percent | 55–65 |
| Bismuth | mol. percent | 17–32 |
| Antimony | mol. percent | 8–23 |
| At least one of silver, mercury and gold | wgt. percent | [1] 0–0.56 |
| At least one of selenium and sulfur | wgt. percent | [1] 0–1.7 |

[1] Based on the total weight of Te, Bi and Sb.

2. A thermoelectric alloy consisting essentially of:

| | | |
|---|---|---|
| Tellurium | mol. percent | 60 |
| Bismuth | mol. percent | 20 |
| Antimony | mol. percent | 20 |
| Silver | wgt. percent | [1] 0.28 |
| Selenium | wgt. percent | [1] 0.56 |

[1] Based on the total weight of Te, Bi and Sb.

3. A thermoelectric alloy consisting essentially of:

| | | |
|---|---|---|
| Tellurium | mol. percent | 60 |
| Bismuth | mol. percent | 27 |
| Antimony | mol. percent | 13 |
| Silver | wgt. percent | [1] 0.28 |
| Selenium | wgt. percent | [1] 0.56 |

[1] Based on the total weight of Te, Bi and Sb.

4. A thermoelectric alloy consisting essentially of:

| | | |
|---|---|---|
| Tellurium | mol. percent | 60 |
| Bismuth | mol. percent | 32 |
| Antimony | mol. percent | 8 |
| Silver | wgt. percent | [1] 0.28 |
| Selenium | wgt. percent | [1] 0.56 |

[1] Based on the total weight of Te, Bi and Sb.

5. A thermoelectric alloy consisting essentially of:

| | | |
|---|---|---|
| Tellurium | mol. percent | 60 |
| Bismuth | mol. percent | 17 |
| Antimony | mol. percent | 23 |
| Silver | wgt. percent | [1] 0.28 |
| Selenium | wgt. percent | [1] 0.56 |

[1] Based on the total weight of Te, Bi and Sb.

6. A thermoelectric alloy consisting essentially of:

| | Mol. percent |
|---|---|
| Tellurium | 60 |
| Bismuth | 20 |
| Antimony | 20 |

7. A thermoelectric element comprising two circuit members of thermoelectrically complementary materials, said members being conductively joined to form a thermoelectric junction, one of said two members consisting essentially of an alloy of:

| | | |
|---|---|---|
| Tellurium | mol. percent | 55–65 |
| Bismuth | mol. percent | 17–32 |
| Antimony | mol. percent | 8–23 |
| At least one of silver, mercury and gold | wgt. percent | [1] 0–0.56 |
| At least one of selenium and sulfur | wgt. percent | [1] 0–1.7 |

[1] Based on the total weight of Te, Bi and Sb.

8. A thermoelectric element comprising two circuit members of thermoelectrically complementary materials, said members being conductively joined to form a thermoelectric junction, one of said two members consisting essentially of an alloy of:

| | | |
|---|---|---|
| Tellurium | mol. percent | 60 |
| Bismuth | mol. percent | 20 |
| Antimony | mol. percent | 20 |
| Silver | wgt. percent | [1] 0.28 |
| Selenium | wgt. percent | [1] 0.56 |

[1] Based on the total weight of Te, Bi and Sb.

References Cited in the file of this patent

UNITED STATES PATENTS

| | | |
|---|---|---|
| 2,264,073 | Faus | Nov. 25, 1941 |
| 2,397,756 | Schwarz | Apr. 2, 1946 |
| 2,685,608 | Justi | Aug. 3, 1954 |